United States Patent [19]

Sherwood

[11] Patent Number: 4,797,312
[45] Date of Patent: Jan. 10, 1989

[54] FOAM-HONEYCOMB ARTICLE AND METHOD

[76] Inventor: Kent Sherwood, 2612 Highland Ave., Santa Monica, Calif. 90405

[21] Appl. No.: 103,449

[22] Filed: Sep. 30, 1987

[51] Int. Cl.$^4$ .......................... B32B 1/04; B32B 3/02; A63C 15/05
[52] U.S. Cl. .................................. 428/117; 264/45.3; 264/46.4; 264/46.5; 264/46.6; 428/71; 428/309.9; 428/316.6; 441/74
[58] Field of Search ................ 428/71, 73, 117, 309.9, 428/316.6, 304.4; 264/45.3, 46.4, 46.5, 46.6; 441/68, 74

[56] References Cited

U.S. PATENT DOCUMENTS

| | | | |
|---|---|---|---|
| 3,543,315 | 12/1970 | Hoffman | 428/304.4 |
| 4,330,494 | 5/1982 | Iwata et al. | 428/117 |
| 4,379,103 | 4/1983 | Doerfling | 428/309.9 |
| 4,510,105 | 4/1985 | Sherwood | 428/316.6 |
| 4,664,974 | 5/1987 | Sherwood | 428/309.9 |
| 4,687,691 | 8/1987 | Kay | 428/316.6 |
| 4,753,836 | 6/1988 | Mizell | 441/74 |

FOREIGN PATENT DOCUMENTS

| | | | |
|---|---|---|---|
| 56-142058 | 11/1981 | Japan | 428/309.9 |

*Primary Examiner*—William J. Van Balen
*Attorney, Agent, or Firm*—Freilich, Hornbaker, Rosen & Fernandez

[57] ABSTRACT

A surface-reinforced lightweight article is described, which includes a honeycomb structure whose sidewalls are reinforced by an expanded foam. The article can be manufactured by laying a fibrous third layer, such as several layers of dry tissue paper backed by a layer of dry fiberglass cloth, on the walls of a mold, laying a second layer of multi-cell honeycomb-like material against the third layer, and laying a finely porous first layer such as tissue paper over the second layer. Foamable plastic is poured in the mold over the three layers and the mold is closed. As the plastic foams and expands, it forces the three layers into a tight sandwich and permeates the layers to reinforce them. Specifically, expanded foam in the cells of multi-cell honeycomb-type material braces the honeycomb sidewalls against collapse, to greatly increase the strength and rigidness of the article. It is found that the density of foam is much greater in the cells than in the core of the article that lies inside the layers, so that high strength foam lies where it is needed while keeping the core lightweight.

9 Claims, 2 Drawing Sheets

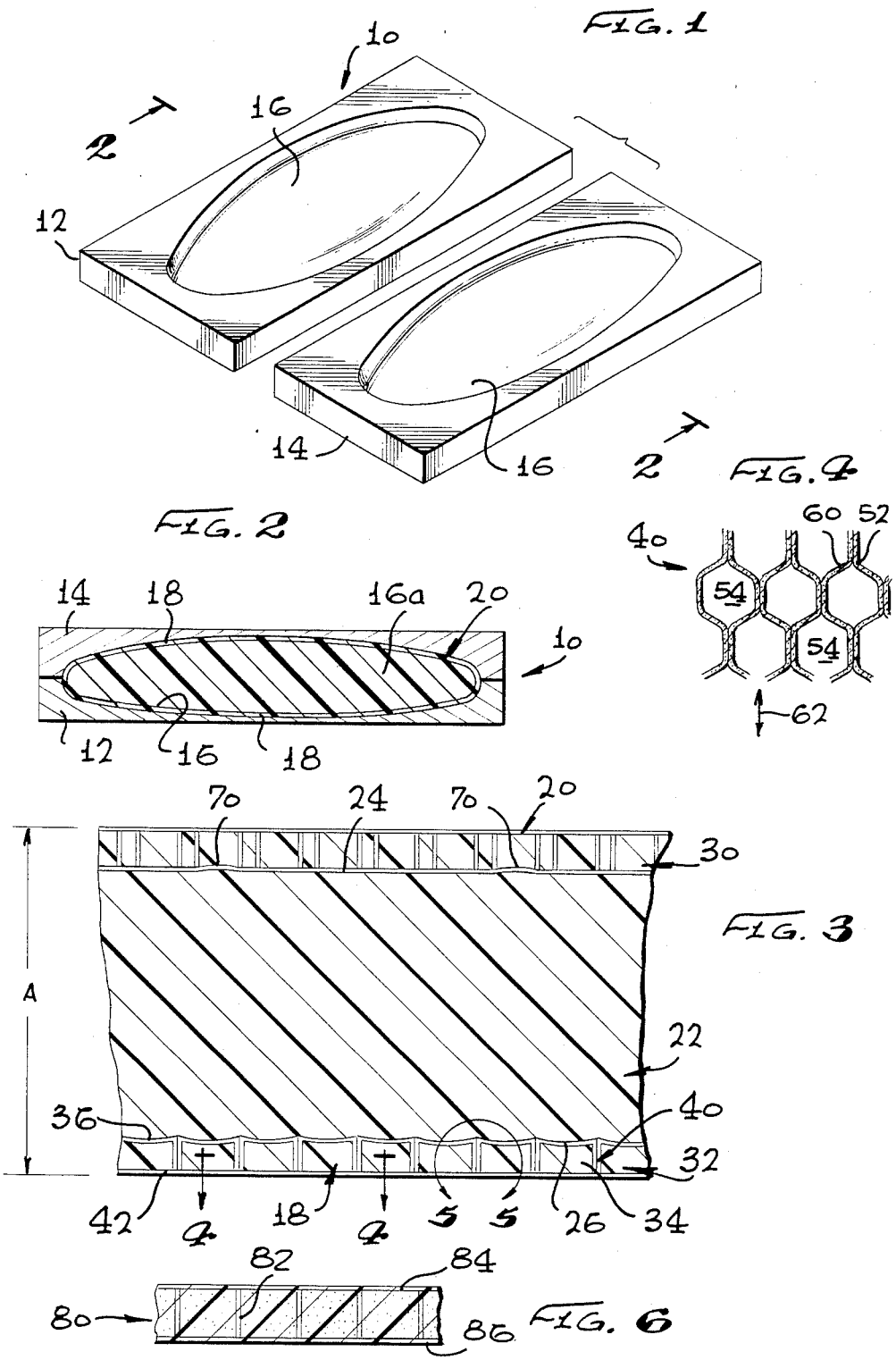

FOAM-HONEYCOMB ARTICLE AND METHOD

BACKGROUND OF THE INVENTION

The surface of a foam article can be strengthened by using fibrous material, such as tissue paper backed by fiberglass cloth, at the surface of the article and impregnating the fibrous material with the same foam used for the core of the article. My earlier patents U.S. Pat. No. 4,510,105 and 4,664,974 describe articles of this type and methods for manufacturing it. While the articles described in these patents provide relatively high strength at the surface and rigidity in the overall article, while enabling a good surface finish to be produced, there are many applications where further increase in the surface and overall article rigidity and strength are required as in surfboards, airplane wings, propellers for wind-energy machines, etc. It would be possible to stack numerous layers of fiberglass to a thickness of perhaps $\frac{1}{4}$ inch near the surface, to be impregnated with foam, but this would add considerably to the weight of the finished article, especially for articles having a thickness of no more than a few inches and wherein opposite faces of the article are both reforced. A foam article which had a further reinforcement of the foam-impregnated fibrous layers near the surface to increase the surface and overall article rigidity and strength, while minimally increasing the weight of the article, would be of considerable value.

SUMMARY OF THE INVENTION

In accordance with one embodiment of the present invention, a method and apparatus are provided which result in a foam article having especially high rigidity and strength at low weight. The article includes a foam-impregnated layer near the surface, backed up by a foam-impregnated multi-cell honeycomb-type material. An entire article can include a core of foam separated from the multi-cell honeycomb type material by a porous but flow-through resistant material, with the foam in the multi-cell material being of higher density than the foam in the core.

The method can include laying a dry fibrous third layer against the mold cavity walls, and laying a multi-cell honeycomb-type second layer against the third layer. A porous but flow through-resistant first layer can be laid against the multi-cell second layer. A foamable liquid is poured into the mold and the mold is closed. As the foamable liquid foams it expands, presses the layers into a firm sandwich and slowly penetrates the layers. The foam in the multi-cell second layer can be "trapped" between the first and third layers and can achieve a higher density than the foam core to firmly support the sidewalls of the multi-cell honeycomb-type material. The first layer can be fibrous and include fine fibers near the surface and coarser fibers further from the surface. The sidewalls of the multi-cell honeycomb-type material includes largely flat sidewall extending perpendicular to the surface of the article to provide high rigidity. The expanded foam within the cells prevent the sidewalls from collapse and also provide continuity between the fiber-impregnated foam region and a possibly unreinforced foam core, to support the fiber-impregnated-foam near the surface and regions between the walls of the multi-cell material.

The novel features of the invention are set forth with particularity in the appended claims. The invention will be best understood from the following description when read in conjunction with the accompanying drawings.

BRIEF DESCRIPTION OF THE DRAWINGS

FIG. 1 is a perspective view of an open mold useful in the present invention.

FIG. 2 is a view taken on the line 2—2 of FIG. 1, with the mold closed and a molded product in the mold.

FIG. 3 is an enlarged view of a portion of the molded product of FIG. 2.

FIG. 4 is a partial view taken on the line 4—4 of FIG. 3.

FIG. 6 is a partial sectional view of an article constructed in accordance with another embodiment of the invention.

DESCRIPTION OF THE PREFERRED EMBODIMENT

Figure 5:
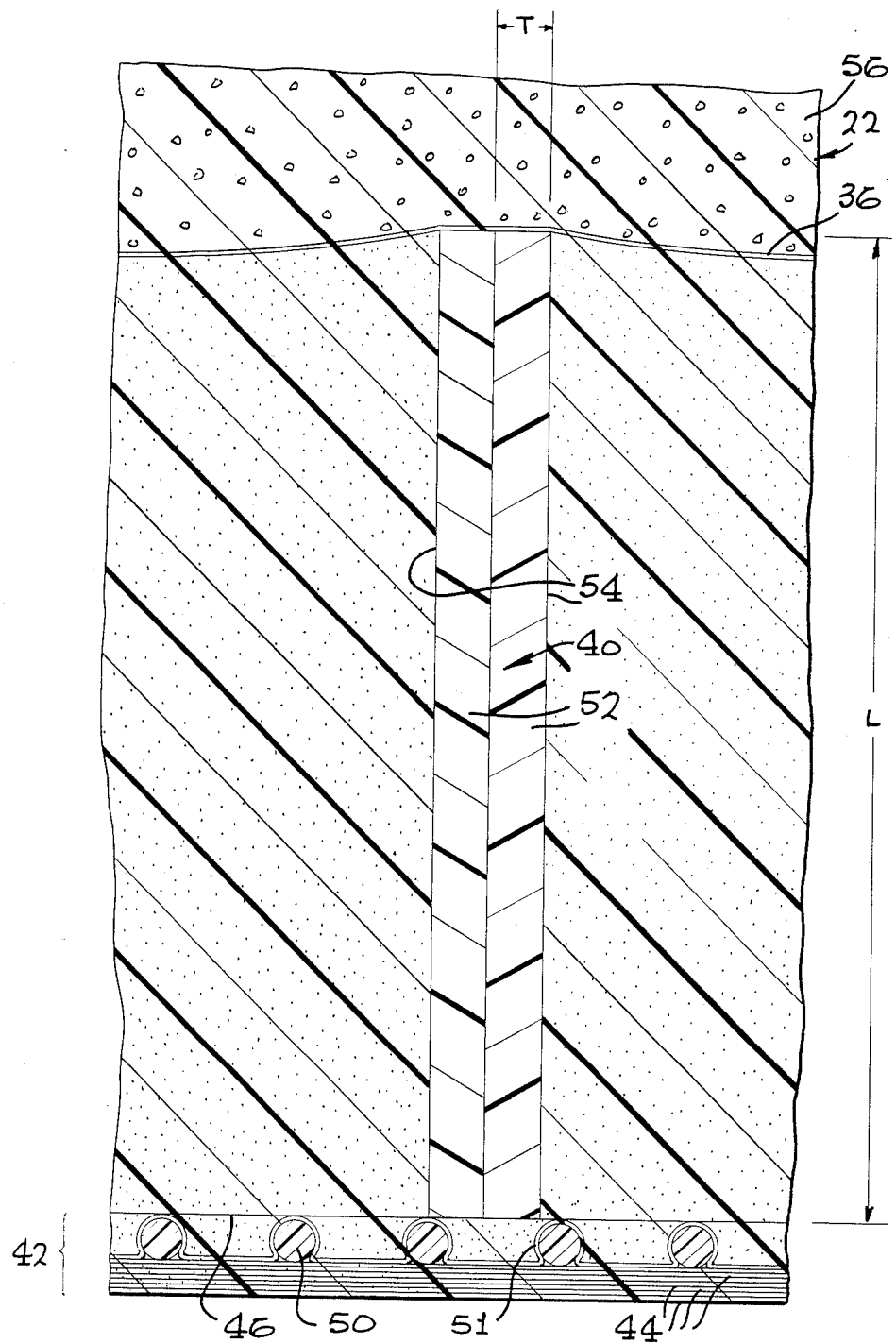
FIG. 5 is an enlarged view of the area 5—5 of FIG. 3.

FIG. 1 illustrates a mold 10 with two parts 12, 14 that form a mold cavity 16 defining the shape of the particular article such as a surfboard, airplane wing, etc. To form the article, a group of layers of porous dry material shown at 18 in FIG. 2, which will strength the surface region of the finished article, are laid on each mold part. The mixed components of a foamable material are then poured into the cavity portion of one mold part such as 12, and the mold is closed. The foaming material expands to substantially fill the cavity 16, to fill the volume 16a lying within the group of surface layers 18 as well as to fill most of the thickness of the layers. After the foam has hardened the mold is opened, the molded article 20 is removed, and then finishing operations are performed on the article.

FIG. 3 shows a portion of the article 20 after it is removed from the mold. The article includes a thick foam core 22 having opposite sides 24, 26, the article having surface regions 30, 32 lying at the opposite sides of the core. Each surface region such as 32 includes a group of layers 18 impregnated with a foam surface portion 34. A group of layers 18 includes a thin porous first layer 36 lying at one side 26 of the foam core, a multi-cell honeycomb layer or honeycomb type sheet structure lying on the outer side of the first layer 36, and a fibrous third layer 42 lying on the outer side of the honeycomb sheet structure 40, all three layers being impregnated with foam. A honeycomb type sheet structure is a structure with interconnecting sidewalls that are each of a length L (FIG. 5) that is a plurality of times greater than its thickness T, and that leaves spaces or cells 54 between the sidewalls which are wider than the sidewall thickness.

FIG. 5 shows details of the region 5—5 of FIG. 3. The porous and preferably fibrous third layer 42 may be formed of multiple sheets of tissue paper 44 at the surface 46 of the unfinished article, backed by a woven fiberglass 50. An additional flow-through resistant but porous sheet 51 of tissue lies behind the fiberglass to help press the fiberglass against the mold wall during molding. The honeycomb 40 includes multiple sidewalls 52 extending like columns perpendicular to the surface 46 of the article, and having a column length L which is a plurality of times greater than the thickness T of each sidewall. The honeycomb forms multiple cells 54 that each have a thickness equal to the height of the sidewalls 52. The first layer 36 is formed of a material which is porous to the flow through of foam while resisting free flow therethrough, and may be formed of a tissue paper, similar to those at 44 and 51. All of the three layers 36, 40, 42 are impregnated with foam of the same type as the foam of the core 22, and which is integral therewith. However, the foam surface portion 34, including the foam portion within the honeycomb cells 54, is of a higher density than the foam portion 56 lying in the core 22.

The article can be formed by laying sheets of fine fibrous material, such as the multiple tissue sheets 54 on the mold walls, and then a material with thicker fibers such as a fiberglass 50, backed by a sheet of fine fibrous material such as tissue sheet 51. The honeycomb sheet 40 is then layed on the first layer 42, and the porous first layer 36 is laid against the inner surface of the fiberglass. While the honeycomb material is thicker than the other layers, it is very flexible and can be laid over large regions of the mold, although there can initially be air gaps between the various layers in between the third layer and the mold wall. After the layers are emplaced, the foamable mixture is poured in and the mold is closed, and the foamable mixture expands within the cavity. As the foamable material expands, it presses up against the somewhat porous first layer 36 which presses against the honeycomb layer 40, which presses against the fibrous third layer 42, to press all layers into a tight sandwich and the sandwich tightly against the walls of the cavity. The foam penetrates the first layer, fills the cells 54 of the honeycomb layer, deforms and penetrates the tissue sheet 51 and penetrates the spaces between strands of the fiberglass 50 of the third layer, and slowly penetrates the fine fibrous tissue paper 44 of the third layer. The amount of foam is such that not all sheets of the tissue paper 44 are penetrated, which facilitate removal of the article from the mold. The manner of laying down the third layer and the action by which it is pressed against the mode walls and penetrated, is largely similar to that described in my earlier U.S. Pat. No. 4,510,105.

It is well known that an article formed of a foam material has the advantage of very light weight, although without surface reinforcement the article is subject to damage either at its surface or by damage through its entire cross section. In my earlier patents U.S. Pat. Nos. 4,510,105 and 4,664,974, I describe the reinforcement of the surface of a foam article by fibrous material impregnated by the same foam as the core of the article, with the fibrous material including fine fibers at the surface backed by coarser fibers just below it, similar to the third layer 42 of FIG. 5. While such foam-impregnated fibrous surface structure greatly increases the strength of the article, the increase is limited because the fibrous material is thin such as about 1/64 inch thick. It would be possible to lay many layers of fiberglass against the outermost layer, to a thickness such as ¼ inch, which will be impregnated with foam, but this has several disadvantages. One disadvantage is the cost of many layers of fiberglass while another disadvantage is the considerable weight of such a thickness of fiberglass. The use of a honeycomb layer enables reinforcement of the fibrous layers with a very light weight structure.

The honeycomb layer can have a configuration such as shown in FIG. 4, wherein multiple strips 60 of resin-impregnated paper are bonded into multiple cells that may be of generally hexogonal shape, although a variety of other shapes can be used. The sidewalls act as tension-resisting members, which resist tension forces as indicated at 62. The foam within the cells helps resist elongation of the cells, to resist such tension forces. The foam within the cells as well as the cell walls also resist compression forces in the direction of arrows 62. As shown in FIG. 5, the length L of each sidewall 52 of the honeycomb type structure is a plurality of times greater than the thickness T of the sidewall. This allows the cell wall to resist bending forces like a tall but thin beam and also to resist compression forces like a column. The presence of compressed foam 34 within the cells, which presses against the sidewalls 52 of the honeycomb structure, results in support for the sidewalls 52 against collapse, to greatly strengthen the structure. Since, most of the volume of the honeycomb structure in the article is occupied by foam, the weight of the foam-filled honeycomb structure is small.

Applicant has found that the above-described method for manufacturing the foam article results in the foam in the surface portion being of greater density than the foam in the core, such as three times as great. This is advantageous because a higher density, and consequently greater strength, of foam in the cells enables such foam to better support the sidewalls of the honeycomb type structure.

In one article applicant has constructed, of the type shown in FIGS. 3 and 5, the article had an overall thickness A of 2½ inches. The foam in the core 22 was polyurethane foam which had a density of about 2 lbs. per cubic foot while the foam in the core had a density about three times as great. The porous first layer 36 was formed of tissue with openings of less than 0.01 inch width, which was of low cost and provided resistence to flowthrough of foam. The third layer 42 included about six layers of tissue paper 44, a layer 50 of woven fiberglass of a weight of four ounces per square yard, and a tissue layer 51. The fiberglass 50 had a thickness of about seven thousanths inch. The honeycomb layer 50 had a thickness of ¼ inch and a weight of 20 grams per square foot. It can be seen that it would require perhaps thirty layers of fiberglass to form the same thickness of about ¼ inch as the honeycomb layer, and the fiberglass layers would weigh about thirteen times as much. Also, while the honeycomb layer 40 costs about 20 cents per square foot, the fiberglass layer 50 costs about 33 cents per square foot, and about $10.00 per square foot for multiple layers having a combined thickness of about ¼ inch. Thus, the use of a honeycomb-type sheet to back up the fibrous material near the surface, with both being impregnated with foam that is integral with the foam of the core, and especially with the foam in the honeycomb cells being of a higher density than the foam in the core, result in an article of high strength and low weight, and which can be constructed at low cost.

It may be noted that, as shown in FIG. 3, the first layer 36 has a catenary curvature as at 70 between the sidewalls of the honeycomb sheet structure 40. This is believed due to the weight of the foaming material when it is laid on the first layer 36. A somewhat similar, though less pronounced, upward curvature indicated at 72 is also found in the upper surface region which lies uppermost in the mold.

FIG. 6 illustrates another article 80 wherein a single honeycomb sheet structure 82 extends along most of the thickness of the article. This is generally practical only for an article with parallel opposite surfaces, since an article with nonparallel surfaces such as 20 (FIG. 2) would require the thickness of the honeycomb layer to vary with article thickness. The article 80 has porous layers 84, 86 which may be of the type shown at 42 in FIG. 5, and which lie at the opposite surfaces of the article. The article can be molded by placing the lowermost fibrous layer 86 on a lower mold part, placing the honeycomb sheet structure 82 on it, filling each of the cells of a honeycomb with a foamable mixture, placing the uppermost layer 84 on top of the honeycomb structure, and placing an uppermost mold portion or press on top of the sandwich.

Thus, the invention provides a primarily foam article and method for manufacturing it, which has a highly reinforced surface. Porous (preferably fibrous) material lies close to the surface, and is braced by honeycomb, with both the porous material and honeycomb material being impregnated with foam. This can be accomplished in an article with opposite surface regions each having their own porous (preferably fibrous) layer and honeycomb layer, with the inner surface of each honeycomb layer backed by a porous layer that allows foam to flow therethrough while resisting such passage, to assure that the layers are pressed firmly against the mold surface. The density of foam in the surface region, especially in the cells of a honeycomb-type structure, is preferably higher than the density of foam in the core.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A surface-reinforced article, comprising:
a core of foam material having a first outer side;
a surface region of said article which includes a porous but flow-through resistant first layer lying on said outer side of said core, a multi-cell honeycomb-type sheet structure lying outside said first layer and a fibrous third layer lying outside said honeycomb-type structure;
said first layer, said cells of said honeycomb-type sheet structure, and said fibrous third layer each being impregnated with the same foam material as said core, and the foam material in said core, first layer, cells, and third layer is of the same composition throughout.

2. The article described in claim 1 wherein
the density of said foam in said cells of said honeycomb-type structure is at least twice the density of foam in said core.

3. The article described in claim 1 wherein:
said core is thicker than said surface region, said core is formed only of the foam material which impregnates said first layer, cells, and third layer, and said core has a second side; and including
a second surface region substantially identical to said first mentioned surface region, lying at said second side of said core.

4. A method for constructing a surface-reinforced foam article comprising:
laying a substantially dry porous but flow-through resistant third layer of fibrous flexible material at the walls of a mold cavity;
laying a layer of multi-cell honeycomb-like material over said third layer, so a first face of said multi-cell material is closest to said third layer;
laying a substantially dry porous but flow-through resistant first layer over a second face of said layer of multi-cell material which lies opposite said first face;
filling said mold cavity inside said first layer, with hardenable foamable material, closing said cavity and allowing said foamable material to fill said cavity inside said first layer, to permeate said first layer and then fill the cells of said multi-cell layer, and to permeate at least partially through said third layer, and allowing said foam to harden.

5. The method described in claim 4 wherein
said step of allowing said foamable material to fill the cells of said multi-cell layer includes filling said cells to a density at least twice the density of said foam inside said first layer.

6. A method for forming a reinforced article comprising:
establishing first and third layers of porous but flow-through resistant material at opposite faces of a second layer of multi-cell honeycomb-type material, where said second layer is a plurality of times thicker than said first and third layers;
establishing a mold with a wall at a side of said third layer which is opposite said second layer, to back up said third layer,
placing a foamable material which solidifies into a solid, into said mold and closing said mold, to flow said foamable material through said third layer, into the cells of said second layer and at least partially through said third layer, and solidifying said foam material.

7. The method described in claim 6 wherein:
said first, second and third layers form a first sandwich;
establishing fourth, fifth and sixth layers that are substantially identical to said first, second and third layers respectively, with said fifth layer sandwiched between said fourth and sixth layer to form a second sandwich;
flowing said foamable material through said first and fourth layers and through said second and fifth layers and at least partially into said third and sixth layer and solidifying said foamable material;
said step of establishing including positioning said first and second sandwiches primarily parallel but spaced apart to leave an intermediate space between them, and said step of flowing includes initially establishing substantially only said foamable material in said intermediate space and allowing foamable material to fill said intermediate space and later solidify therein.

8. A surface-reinforced article, comprising:
a foam core having first and second opposite outer sides;
first and second surface regions lying over said first and second outer sides of said core;
said first surface region including a multi-cell honeycomb-type sheet structure, a fibrous layer lying at a face of said honeycomb-type sheet structure which is furthest from sai core, and an inner layer of porous but flow-through resistant material lying between said core and said honeycomb-type sheet structure;
said first surface region, including said honeycomb-type sheet structure and said fibrous layer thereof, being impregnated with a foam material and said core being formed substantially solely of the same foam material as said foam material which impregnates said first surface region and with the foam material of said core and in said first surface region being homogenous.

9. The article described in claim 8 wherein
the density of said foam material in said honeycomb-type sheet structure is at least about twice as great as the density of said foam material in said core.

* * * * *